_(12)_ United States Patent
Leone, III et al.

(10) Patent No.: US 7,443,523 B2
(45) Date of Patent: Oct. 28, 2008

(54) PRINTING TO A CLIENT SITE FROM AN APPLICATION RUNNING ON A REMOTE SERVER

(75) Inventors: Anthony J. Leone, III, Pittsford, NY (US); David A. Kavanagh, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1071 days.

(21) Appl. No.: 10/303,491

(22) Filed: Nov. 22, 2002

(65) Prior Publication Data

US 2004/0100651 A1   May 27, 2004

(51) Int. Cl.
*G06F 15/00* (2006.01)
(52) U.S. Cl. .................... 358/1.15; 358/1.13
(58) Field of Classification Search .......... 358/1.15, 358/1.13
See application file for complete search history.

(56) References Cited

U.S. PATENT DOCUMENTS

| | | | | |
|---|---|---|---|---|
| 5,559,933 A | * | 9/1996 | Boswell | 358/1.15 |
| 6,201,611 B1 | | 3/2001 | Carter et al. | 358/1.15 |
| 6,421,716 B1 | * | 7/2002 | Eldridge et al. | 709/219 |
| 6,958,824 B2 | * | 10/2005 | Whitmarsh | 358/1.15 |
| 2002/0191019 A1 | * | 12/2002 | Pickett | 345/764 |
| 2002/0196460 A1 | * | 12/2002 | Parry | 358/1.15 |
| 2003/0169446 A1 | * | 9/2003 | Grohs et al. | 358/1.15 |
| 2004/0010573 A1 | * | 1/2004 | Debaty et al. | 709/221 |

FOREIGN PATENT DOCUMENTS

EP    0 999 494 A2    5/2000

* cited by examiner

*Primary Examiner*—King Y Poon
*Assistant Examiner*—Mark R Milia

(57) ABSTRACT

A method for printing at a local printer using the resources of a networked remote application server in which the networked remote application server responds to a print executable request from a local client by downloading a print proxy executable that obtains printing parameters. Upon receipt of printing parameters from the print proxy executable, the networked remote application server generates a printer-dependent data stream and downloads the data stream to the print proxy executable running on the local client. The print proxy executable then uses local printer utilities to execute the print job.

7 Claims, 10 Drawing Sheets

PRINTING TO A CLIENT SITE FROM AN APPLICATION RUNNING ON A REMOTE SERVER

FIELD OF THE INVENTION

The present invention generally relates to networked printing applications. More particularly, there is disclosed a method for printing at a networked client site from a document processing application running on a remote server.

BACKGROUND AND SUMMARY

One major advantage of Wide-Area Networks (WANs) and Local Area Networks (LANs) is the ability to utilize computer resources effectively. To achieve this goal, storage-intensive and computation-intensive functions can be relegated to remote networked computer systems that are optimized for carrying out these functions, allowing local networked client systems to require only minimal resources for storage and processing. The growing use of networking and, in particular, the ubiquity of access tools and utilities such as Internet browsers make it feasible to take advantage of centralized resources on server systems, while minimizing the requirements imposed on client systems. For example, devices such as "thin clients" can, by virtue of network connection, offer access to a broad range of applications run on a remote server. However, the thin clients themselves do not require more than a minimum of memory capacity or computing power.

Image processing is one type of document processing application that can take advantage of this type of remote processing capability. It is recognized that the storage, manipulation, and printing of digitized images can require considerable data processing and storage resources, for example. Complex tasks and applications can tax the resources of a standard desktop computer, requiring instead the speed and resources of a high-end workstation.

It is well known that when images can be uploaded, stored, and processed on a server system, benefits of lower cost, faster speed, and advanced capabilities can be more easily obtained. Currently, a number of commercial systems take advantage of the benefits of network utilization for imaging applications. Examples of such systems include services for uploading and printing of scanned photographs and digital camera images, such as the PhotoNet™ Online network from PictureVision, Herndon, Va., or the OnLine PhotoCenter™ from Konica Photo Imaging, Inc., Mahwah, N.J.

A remote server may be used for running some part or all parts of a document processing application, in conjunction with a client station. For example, U.S. Pat. No. 6,201,611 B1 to Carter et al. discloses a remote server that provides print processing functions. An application that runs on a thin client requests print processing functions from the remote server and provides the input file to be processed and processing parameters as part of this request. In existing prior art systems such as disclosed in U.S. Pat. No. 6,201,611 B1 and generally depicted in FIG. 1, when an operator running an application 18 on a thin client 16 requests a print job for a document, thin client 16 sends the complete document file over a network link 20 to a remote print server 10. The print request sent by thin client 16 includes the document data itself, with all text and images, in a Device-independent Format (DIF), along with print parameters and destination data for a locally connected target printer 24 or for an alternate network-connected target printer 22. A print rendering server 12 then executes an appropriate print driver for the target printer, processing the document file received from the thin client and generating a print data stream in Print-Ready Format (PRF). This data stream goes to a print router 14 on the remote server, which then forwards the PRF data to a print receiver 26 on thin client 16 and from there to locally connected target printer 24. Optionally, the PRF data can go directly to alternate network-connected target printer 22, if printer 22 has a built-in print server 26.

Although the system and method described in U.S. Pat. No. 6,201,611 B1 presents some advantages for more efficient processing of print files when using a thin client, it has a number of significant drawbacks. It is significant to note that in such a prior art system, only the print processing and driver functions are handled by the remote server. The thin client itself runs the balance of the document-processing application. Thus, the thin client generally requires more than a nominal amount of local storage and processing capabilities. Such an arrangement effectively defeats the purpose of the thin client as a major benefit obtained with a thin client is that the thin client device can have minimal storage and processing capabilities, thus minimal cost. To boost speed and performance for such a system would require increasing storage and processing resources at the thin client, so that a workstation may be a more economical and efficient substitute for the thin client.

Another drawback of the prior art system described in U.S. Pat. No. 6,201,611 B1 is that the entire document file, which is resident on the thin client, must be transferred as the DIF file to the print rendering server in the print request. With text files, the DIF file may not be sizable, and thus would not stress system or network resources. However, if a document includes bitmapped, moderate- or high-resolution color images, the resulting DIF file transferred could be very large, resulting in delay of transfer or excessive loading of the network. As another shortcoming of such a system, the alternate network-connected target printer 22 at the client site would require a built-in or attached dedicated print receiver, such as an HTTP server, for example. While there are printers commercially available having built-in HTTP servers, such as the Xerox DocuColor® 12 Printer with Fiery® RIP, such printers are typically high-end devices. There would be advantages to being able to implement a remote printing arrangement using low-cost printer peripherals, where low-cost printers are controlled by the local client. Moreover, HTTP protocol itself, designed primarily for text and Web image transfer, is not optimized for transfer of jobs to a printer and would require additional interface software to support print transmission.

European Patent Application EP 0 999 494 A2 discloses a method for control of remote printers, and input and output devices in general, over the Internet. More specifically, the disclosure teaches that data stored remotely can be transmitted by a server to a printer using HTTP protocol. To initiate a printing operation, a client or "initiator" transmits a request to the server. The server then schedules processing for the job, placing the job in queue. When it is capable of processing the job, the server then converts the job data into proper form for the destination printer. The server may obtain the source data for the document to be printed from the client or from some storage source on the network.

While the method of EP 0 999 494 A2 provides some benefits, there are some inherent drawbacks. Printing operation is managed and controlled from a print server that may be some distance away from the client as well as some distance away from the printer itself. This method requires that a printer be directly connected to the network or connected through a server having an HTTP interface. As with the method disclosed in U.S. Pat. No. 6,201,611 B1, HTTP network protocol may be required for communication with the printer. However, there are more efficient protocols for driving a printer on a network, such as is provided by the LPR utility, for example.

Firewalls, routers, and proxy servers are widely used as one means for protecting local area networks from unauthorized access. One key function of the firewall and related devices is to restrict network interaction to a safe data protocol, such as HTTP. While this arrangement has advantages for data and network security, there are disadvantages for data transfer to output devices such as printers. Significantly, the HTTP firewall, router, or proxy server requires that data be packaged in compatible HTTP formats, which are not optimized for printer bit stream transfer. As a result, some additional mechanism is required in order to pass PRF data from a local network to a remote site through a firewall.

The disclosure of EP 0 999 494 A2 shows the conventional approach used for obtaining networked printing through a firewall or similar device. However, as was noted above, the requirement that each printer provide an HTTP server restricts remote printing to networked printers only. Similarly, U.S. Pat. No. 6,201,611 B1 does not suggest a solution for thin client-to-server communication across a firewall or router, possibly requiring some additional well-known interface between the remote server and each networked printer. Such a solution would be costly, restrictive, and time-consuming to implement.

Computer operating systems, such as Unix® and Microsoft® Windows, for example, each provide some utilities for networked printing. However, conventional operating system printer utilities are intended for local area networks rather than for wide area networks. Current operating systems do not provide methods that allow networked printing over a firewall, router, or proxy server.

The recent Internet Printing Protocol (IPP) initiative addresses some of the problems associated with using printer devices that are, relative to a remote server, protected behind a firewall, router, or proxy server. However, IPP is a protocol for server and client device communication only, without any facility provided for operator interaction. Sending a print job to a printer using IPP requires that the server be provided with the IP address or other address of the target printer.

Thus, it can be seen that while there are networked print server solutions available that allow the use of thin clients and browser-based software to minimize some of the requirements for client resources in document processing systems, there is a need for a networked print server configuration that optimizes the advantages of server processing power, Internet network interaction utilities, and printer interface software and that is specifically designed for robustness and capability over a local area network as well as the capability to transfer printer-ready files over a firewall.

Accordingly, there is disclosed a remote print server that serves any number of remotely connected clients, accepting as input a print request and providing as output a data stream in a print-ready format. In addition there is disclosed a method of printing that allows control, from the client system, of a printer using conventional print utilities that are optimized for local printer control for printing a document residing on a network server. The method disclosed herein further allows any computer platform that is capable of running a browser to access the processing capabilities of a remote print server. Moreover, there is disclosed a method for printing a document residing on a networked application server at a printer controlled by a local client that permits transfer of a printer-ready bit stream across a firewall, router, or proxy server.

In accordance with the teachings herein there is disclosed a method for printing a document residing on a networked application server at a printer controlled by a local client. In one embodiment, the method comprises sending a print executable request from the local client to the networked application server; executing a print proxy executable at the local client, the executing including obtaining a print processing parameter; transferring to the networked application server, as a print specification command, the print processing parameter; and receiving, at the print proxy executable, a printer-dependent data stream conditioned by the print processing parameters in the print specification command, the printer-dependent data stream being rendered at the networked application server.

There is further disclosed a method for printing a document residing on a networked application server at a printer controlled by a local client comprising receiving at the networked application server a print executable request from the local client; receiving at the networked application server a print processing parameter from the a print proxy executable residing on the client; rendering a document at the networked application server in accordance with the print processing parameter to provide a printer-dependent data stream; and transferring, from the networked application server to said print proxy executable, the printer-dependent data stream, wherein the print proxy executable causes the printer-dependent data stream to be transferred to a printer controlled by the local client.

In accordance with the teachings herein, there is provided a method for printing a document at a printer controlled by a local client, wherein the document is stored and modified in a document file that resides on a networked remote application server. The method can be implemented on a broad range of computer platforms and operating systems. The method includes: (a) sending a print executable request from a browser on the local client to the networked application server; (b) in response to said print executable request, transferring, from the networked application server to the browser on the local client, a print proxy executable; (c) executing said print proxy executable at the local client in order to obtain print processing parameters; (d) transferring, as a print specification command, said print processing parameters obtained from said print proxy executable to the networked application server; (e) rendering the document at the networked application server to provide a printer-dependent data stream conditioned by said print processing parameters in said print specification command; (f) transferring, from the networked application server to said print proxy executable, said printer-dependent data stream.

BRIEF DESCRIPTION OF THE DRAWINGS

The embodiments and teachings disclosed herein will be described in detail, with reference to the figures, wherein.

DESCRIPTION

Figure 1:
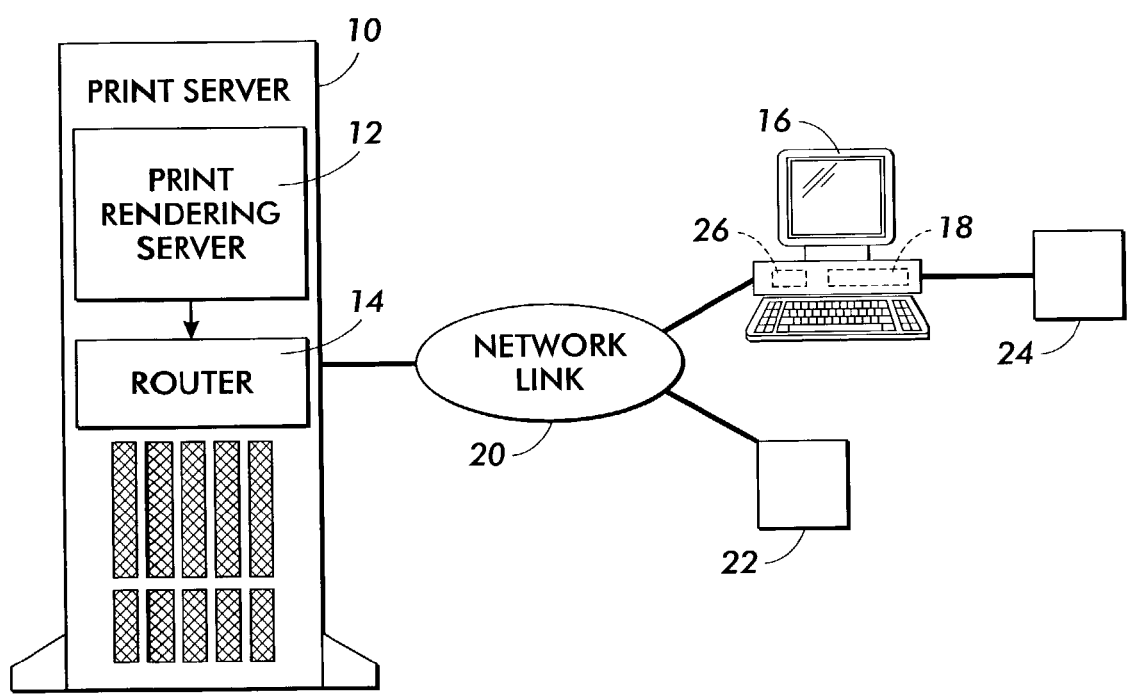
FIG. 1 is a block diagram of a prior art arrangement for using a remote print server.

For a general understanding of the of the embodiments disclosed herein, reference is made to the drawings wherein like reference numerals have been used throughout to designate like devices, circuits, or circuits performing equivalent functions. The present description is directed in particular to elements forming part of, or cooperating more directly with an apparatus or method of operation in accordance with specific embodiments disclosed herein. It is to be understood that elements not specifically shown or described may take various forms well known to those skilled in the art.

Figure 2:
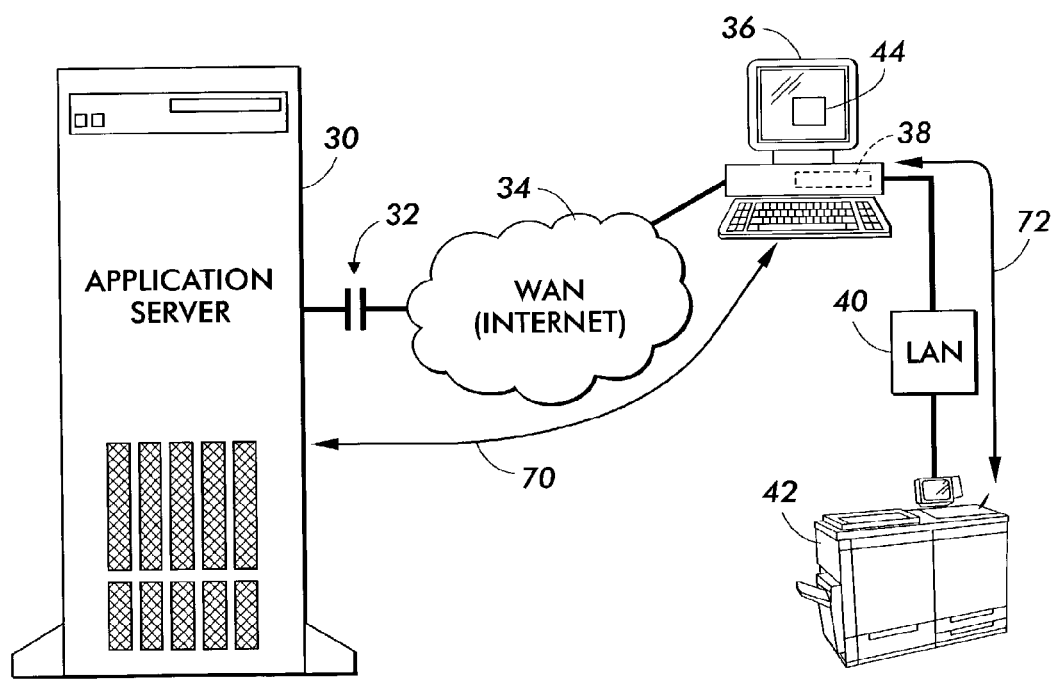
FIG. 2 is a schematic block diagram of an arrangement which is particularly usefully for one or more of the embodiments disclosed herein.

Turning now to FIG. 2, there is shown a block diagram of the overall architecture for a networked system employing the method of one or more embodiments disclosed herein. A remote application server 30 executes a document processing application that is accessible over a Wide Area Network (WAN) 34, such as the Internet, to any number of client platforms 36. Client platform 36 accesses the application running on application server 30 in a conventional manner by means of a browser 44 or similar application to interface with/communicate across WAN 34. An operator at client platform 36 can request a printed output for the document processed on application server 30. In such event, browser 44 transmits a print executable request from client platform 36 to application server 30 via WAN 34. Browser 44 then interacts with application server 30 to download and execute a print proxy applet 38. Print proxy applet 38, which may be encoded using any conventional manner including, but not limited to, Java commands, Active-X control or the like accepts operator specifications for printing, transmits these specifications as a print specification command, and handles the resulting downloading of printer-ready data from application server 30 over WAN 34. Print proxy applet 38 then handles printing of the job to a networked printer 42. Networked printer 42 resides on a Local Area Network (LAN) 40 that is also used by client platform 36.

It is significant to emphasize that the arrangement of FIG. 2 allows printing in a flexible number of different configurations. The WAN 34/LAN 40 combination shown in FIG. 2 is possible with the method of the present invention and has a number of advantages. Where a firewall 32 is provided, printer-ready data must be transferred from application server 30 using an allowable protocol, typically HTTP. It should be appreciated that firewall 32 may alternately be a router or a proxy server. Additionally, devices may be located between WAN 34 and server 30 and/or between WAN 34 and client 36. Communication between using the HTTP mechanism between server 30 and client platform 36 via WAN 34 and, if applicable, firewall 32 are generally identified by communication path 70 in FIG. 2. Print proxy applet 38 on client platform 36 communicates with server 30 to accept the data transmitted using the HTTP mechanism over path 70. For transfer to networked printer 42, print proxy applet 38 re-formats the printer-ready data and transmits this data to networked printer 42 over LAN 40 using communication path 72. By re-formatting the printer-ready data, print proxy applet 38 can use more efficient utilities for printer control, such as LPR, for example.

It should be appreciated that the print executable request sent from client platform 36 need contain only a small amount of data. Recalling that the document file itself is already located on application server 30, the print executable request merely needs to provide sufficient information to identify the sending client platform 36 and the target printer 42. The downloaded applet then obtains print processing information from the operator.

Figure 3:
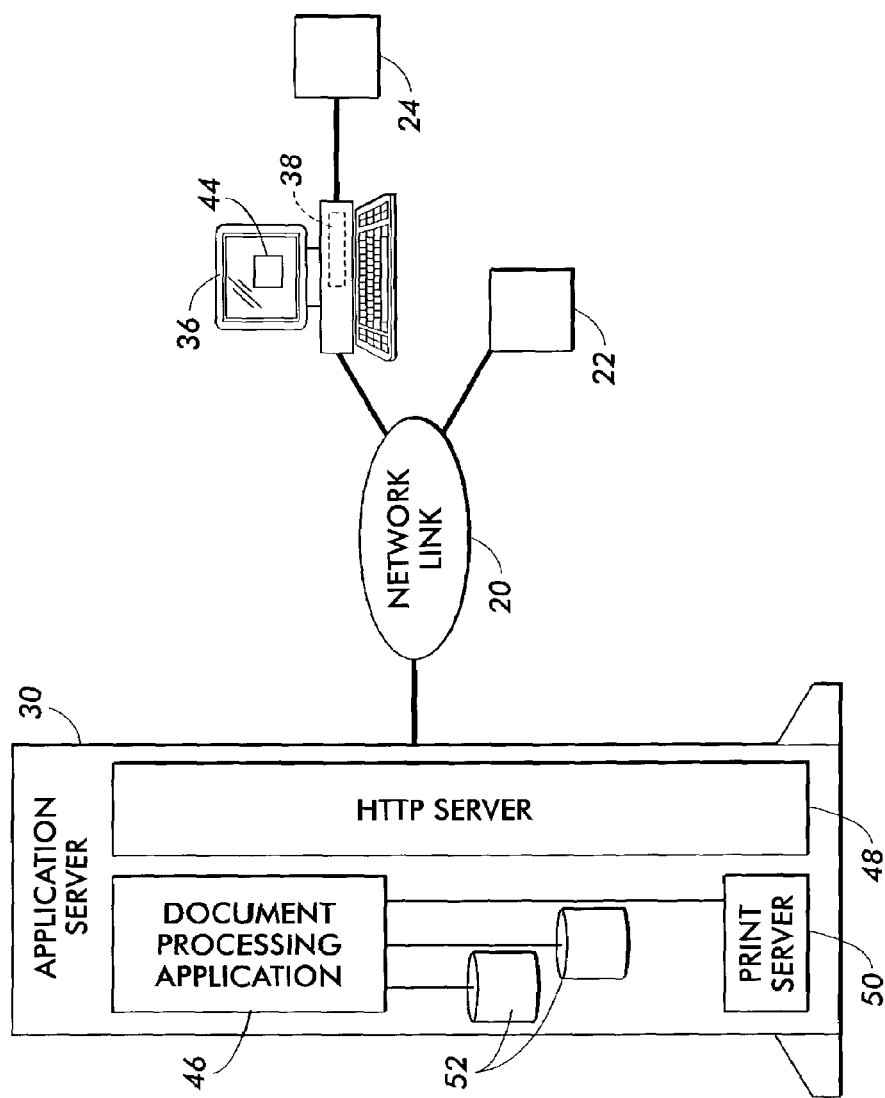
FIG. 3 is a diagram of an architecture for a remote application server running a document processing application processing requests from a networked client system.

Referring to FIG. 3, there is shown a block diagram of architecture for a networked system detailing major functional components of application server 30. In one embodiment, application server 30 is a Windows-based (e.g., WindowsNT® or WindowsXP®) computer having substantial memory and storage 52. An HTTP server 48 provides the interface to network link 20 which may embody the internet, a packet switched network or similar wide area network. Application server 30 executes a document processing application 46. Document processing application 46 could be a word processing application in a simple embodiment. In an alternative embodiment, document processing application 46 includes some text processing capabilities, but is primarily directed to processing and printing of high-resolution bit-mapped color images. For printing, document processing application 46, upon receiving a print specification command from browser 44 on client platform 36, forwards the document data to a print rendering server 50. Print rendering server 50, which may comprise a dedicated hardware and/or software component, provides print output in a format suitable for the target destination printer that is identified in the print specification command. HTTP server 48 performs the transfer of the print-ready data stream from print rendering server 50 to client platform 36, across network link 20.

Upon receipt of the print-ready data at client platform 36, print proxy applet 38 accepts the data and transfers the data to remote printer 22 or "local" printer 24. It should be appreciated that "local" printer 24 can either be directly connected to client 36 using a cable, RF link, IR link or the like or be network connected to client 36 via a local area network.

Figure 4:
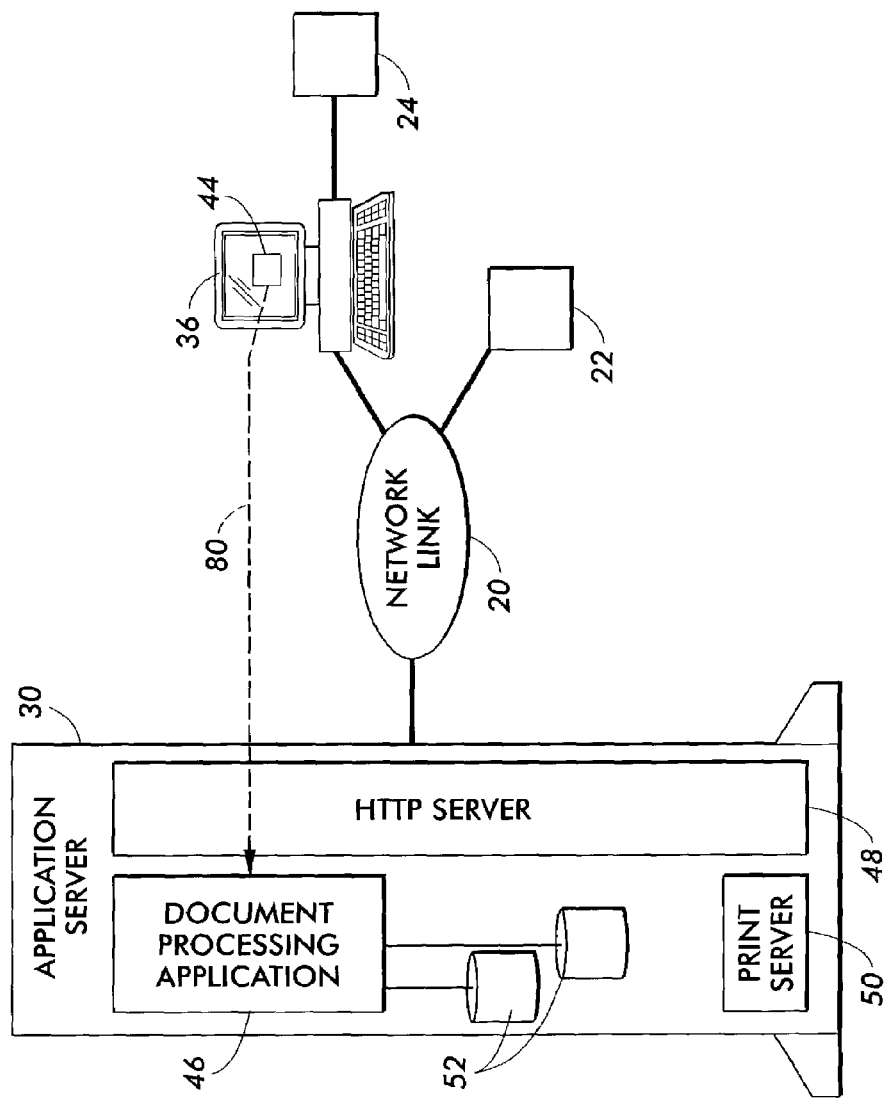
FIGS. 4 through 8 are diagrams illustrating various stages in printing to a networked client site in accordance with the teachings disclosed herein.

Referring to FIGS. 4-8, there is shown the sequence of interaction across network link 20 in order to handle processing of a print job. Referring to FIG. 4, an operator is working with remotely operating document processing application 46 using browser 44. To print a job, the operator clicks an icon or other hypertext-linked field within browser 44. In response, browser 44 transmits an http command, the print executable request, to http server 48 over network link 20 as illustrated by communication 80.

Figure 5:
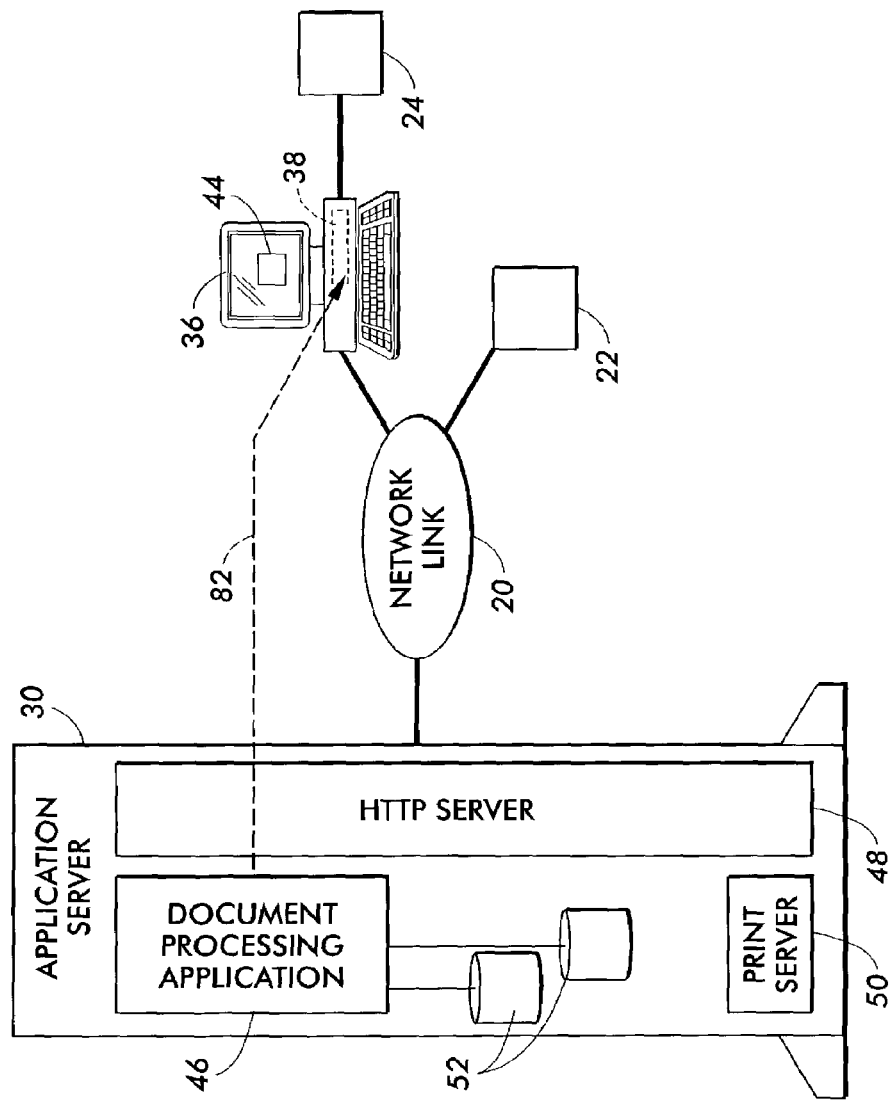
Figure 9:
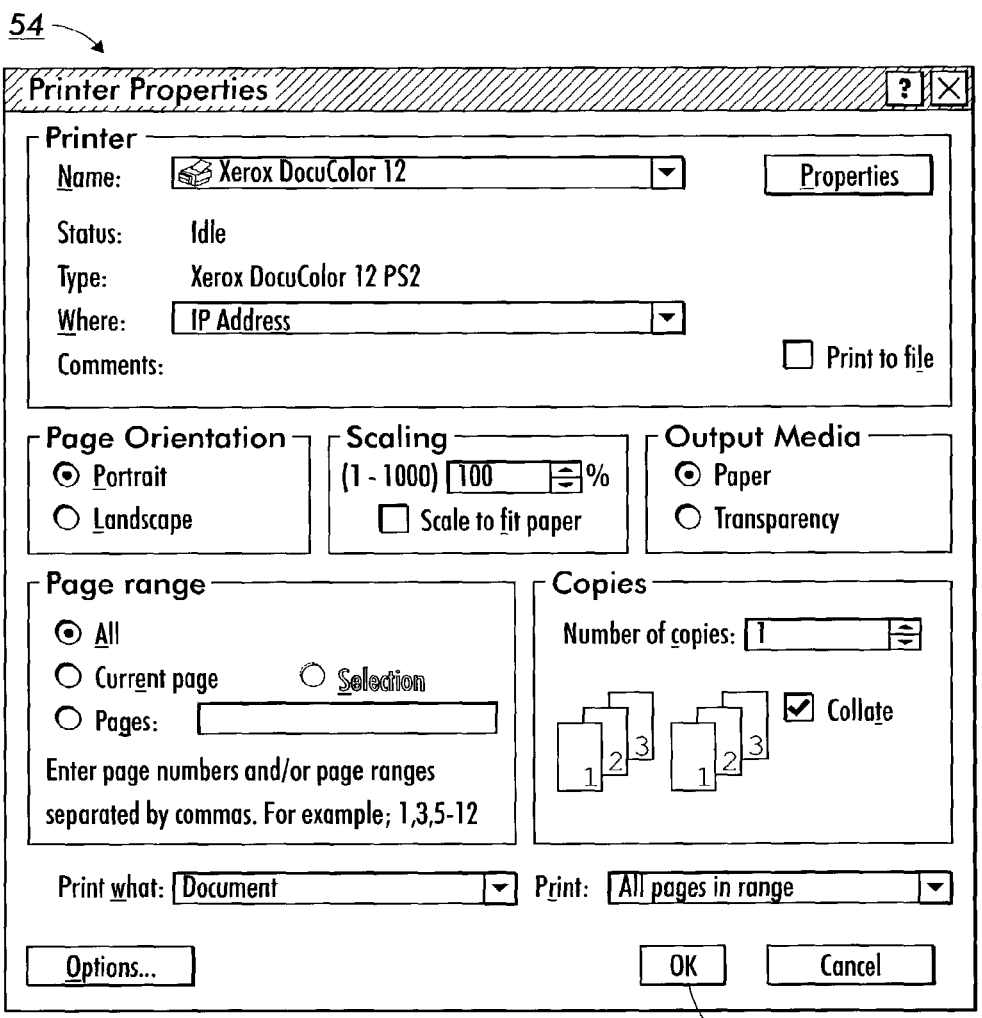
FIG. 9 is a plan view showing a display presented by a print proxy applet in accordance with the teachings herein; and, FIG. 10 is a data interaction diagram illustrating a sequence of commands and data between a networked client system and a remote application server.

As illustrated in FIG. 5, http server 48 responds by sending a response that includes print proxy applet 38 to client 36 (communication 82). Upon receipt at client 36, browser 44 loads and executes print proxy applet 38. The print proxy applet 38 obtains information describing print processing parameters (print job parameters). Such information may be retrieved from a cache or similar store or from an operator at the client. When obtaining information from an operator, print proxy applet 38 may prompt the operator to enter print processing parameters, such as, but not limited to, the following: Printer type (Manufacturer/model, network name); Printer IP address (or other suitable network identifier); Print quantity; Output media characteristics (e.g., media size, paper, transparency); Page layout (portrait/landscape orientation); finishing options (e.g., staple, collation); Imaging characteristics (e.g., draft/final, output resolution, text/graphics/pictorial); Scaling factor; etc. The operator enters all required and any optional information requested by print proxy applet 38, then enters the print specification command, such as by clicking on an icon or field controlled by applet 38. Referring to FIG. 9, there is shown an example 54 display presented by print proxy applet 38 as a prompt for operator entry of print parameters. It should be appreciated in the above process, one or more of the remotely accessing of the document processing application, requesting a print job and executable request transmission, and acquisition of job parameters steps can be an automated process controlled or performed by one or more software applications.

Figure 6:
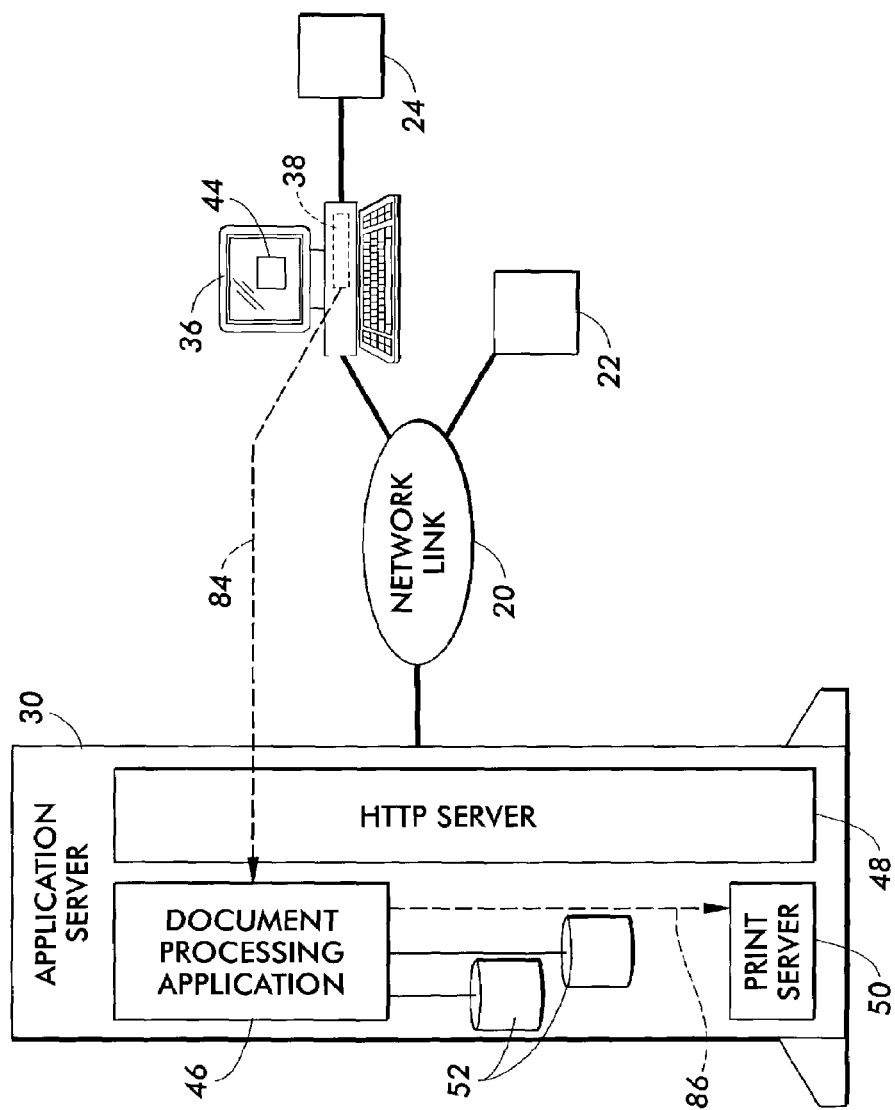

Turning to FIG. 6, print proxy applet 38 responds to the print specification command by transmitting the required parameters, including an unique job ID, back to application server 30 (communication 84). Http server 48 accepts the response from print proxy applet 38 and forwards the data to document processing application 46 (communication 86). Document processing application 46 matches the job ID transmitted by print proxy applet 38 with the specific document being processed. Document processing application 46 then forwards the document to a print server 50 for processing. Print server 50 performs rasterization of the document.

Figure 7:
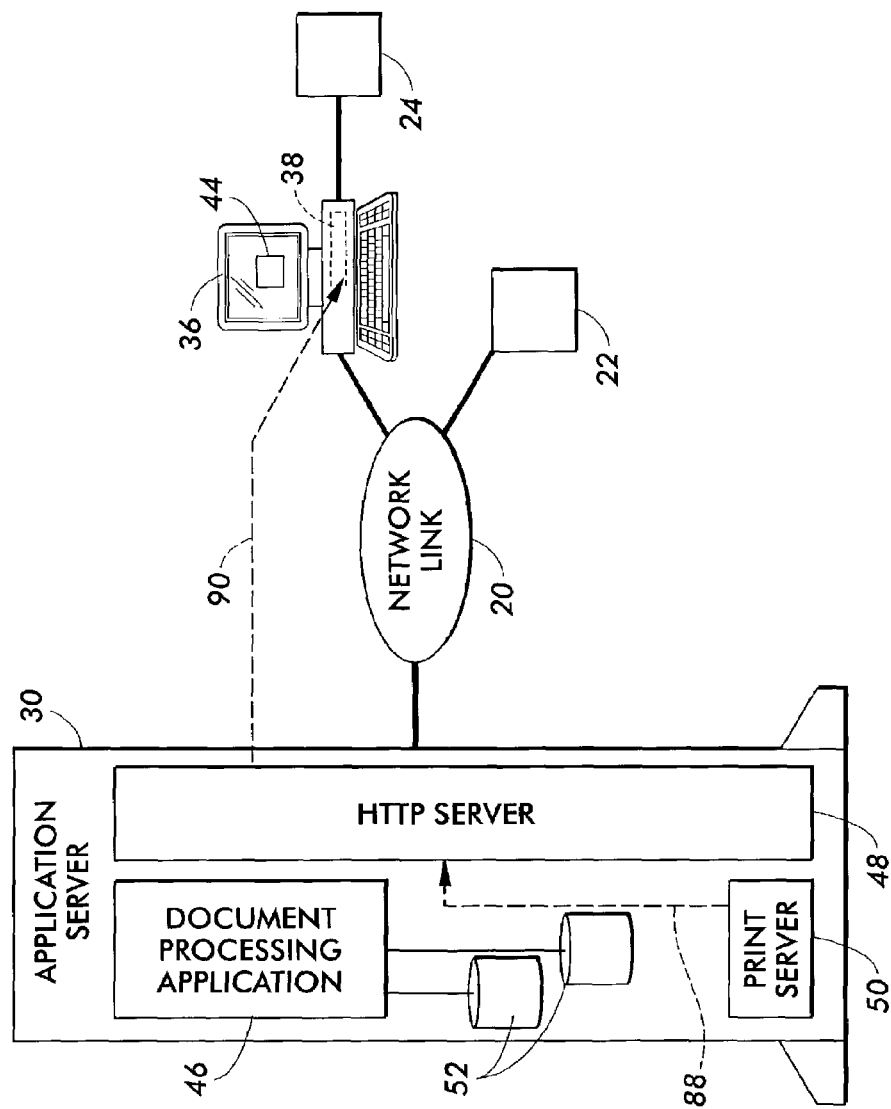
Figure 8:
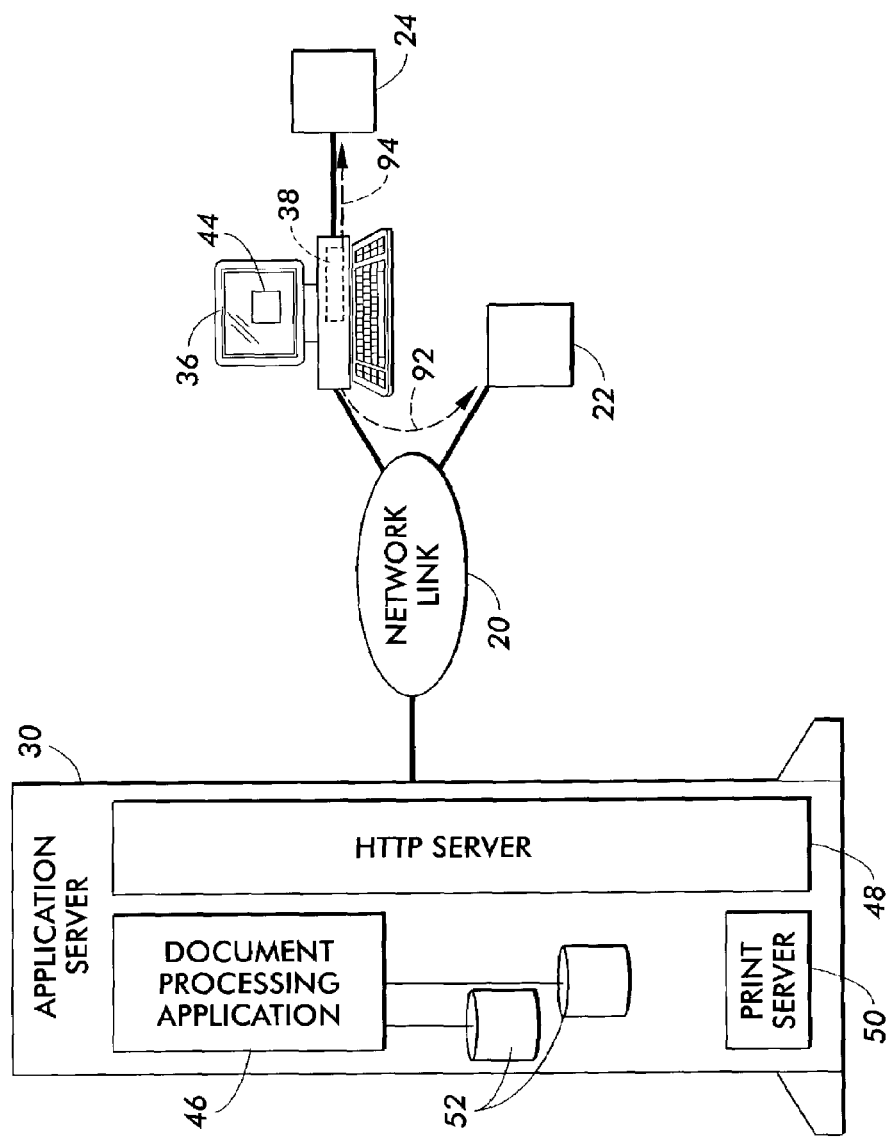

Referring to FIG. 7, print server 50 provides the print job as a rasterized, printer-dependent data stream. Http server 48 accepts this data stream from print server 50 (communication 88) and transfers the printer-dependent data stream back over the http link to print proxy applet 38 on client platform 36 (communication 90). Referring to FIG. 8, print proxy applet 38 then communicates with remote printer 22 (communication 92) or local/networked printer 24 (communication 94) as identified in the job parameters provided to print proxy applet 38 by the operator. Print proxy applet 38 accepts the data stream from application server 30 and transfers the print job to printer 22 or 24.

The format of printer-ready data provided depends on the particular requirements of the output printer that has been selected by the operator during interaction with print proxy applet 38, that is, on the parameters in the print specification command. Printer-ready data could be in a high-level format such as Postscript, requiring a corresponding interpreter at the target printer. However, it may be beneficial to provide printer-ready data in the most primitive format possible, such as fully rasterized data. This arrangement would provide print-ready data that can be used directly by the target printer, requiring a minimum of interface hardware at the printer, with resulting cost savings.

Referring to FIG. 9, there is shown an example 54 display presented by print proxy applet 38 as a prompt for operator entry of print parameters.

Print proxy applet 38 handles any error conditions that occur with printer 22 or 24 operation. In this way, application server 30 is used for rasterization of the printer-dependent data but is not used for direct printer 22/24 control. Print proxy applet 38 makes client platform 36 act as a "proxy" device with respect to a networked application server 30. Print proxy applet 38 is executed by browser 44 until the print job is completed. At completion, print proxy applet 38 is terminated by browser 44.

Figure 10:
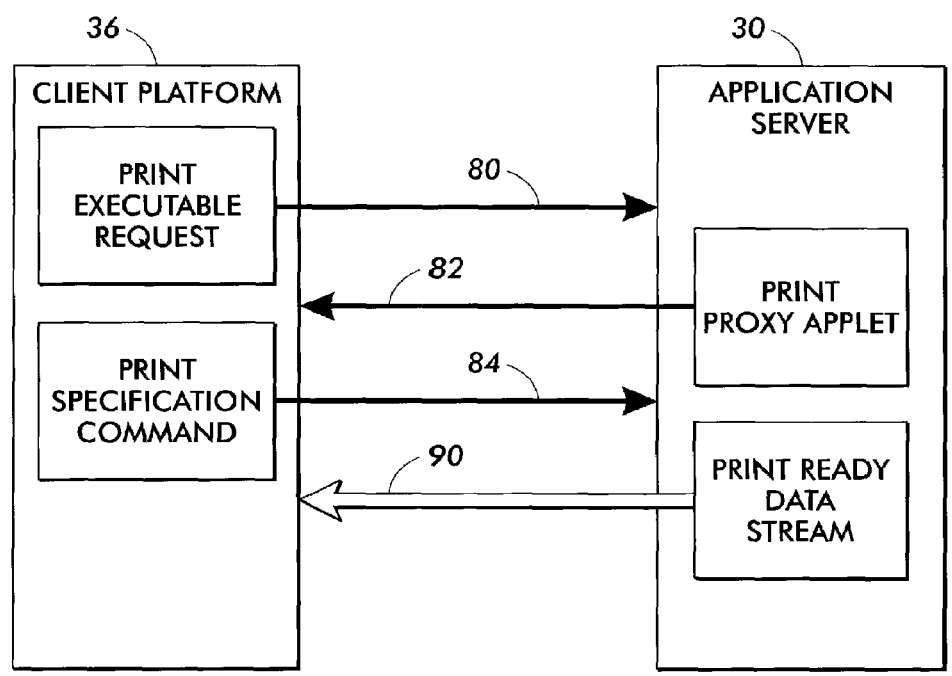

Referring to FIG. 10, there is illustrated a command/data interaction sequence for obtaining printer utilities and the printer-ready file from remote application server 30. The sequence begins with a print executable request sent as communication 80 from networked client platform 36 to application server 30. In response to the print application request, application server 30 supplies a print proxy applet to the client platform via communication 82. When received at client platform 36, the print proxy applet is loaded and executed. When the operator completes the required responses, as in FIG. 9, and selects a print button 56, client platform 36 sends a print specification command to remote application server 30 with communication 84. In response to the print specification command, application server 30 provides a printer-ready format data stream to print proxy applet 38 running on client platform 36 through communication 90.

It can be appreciated that the embodiments of the architectures and methods of operation disclosed herein provide a capable way to obtain printer-ready data across the internet. The teachings herein present are particularly useful where a firewall 32 forms part of wide area network 34, as is shown in FIG. 2. This method enables transfer of printer-ready data through firewall 32 as a transaction over communication path 70. Then, once print proxy applet 38 has obtained printer-ready data, a more suitable local transfer protocol, such as LPR, can be used to transmit printer-ready, rasterized data to networked printer 42/22/24.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A method for printing a document comprising:
    transmitting, from a local client to a networked server, a request to print a document, the document being previously stored on the networked server, the previously stored document being in a printer independent format;
    transmitting, from the networked server to the local client, in response to the request to print, a print proxy applet to obtain print processing parameters;
    transmitting, in response to execution of the print proxy applet, from the local client to a networked server, print processing parameters;
    transmitting, from the networked server to the local client, in accordance with the received print processing parameters, a printer-dependent data stream, the printer-dependent data stream being generated by the networked server in accordance with the received print processing parameters; and
    printing the printer-dependent data stream at a local non-network printer connected to the local client.

2. The method as claimed in claim 1, wherein the printer-dependent data stream includes a printer software utility for controlling the local non-network printer connected to the local client.

3. The method as claimed in claim 1, wherein the printer-dependent data stream includes executable data for controlling the local non-network printer connected to the local client.

4. The method as claimed in claim 1, wherein transmitting the request to print a document and transmitting the printer-dependent data stream employ hypertext transfer protocol.

5. A method of operating a networked device, comprising:
    receiving, at the networked server, a request from a local client to print a document, the document being previously stored on the networked server, the previously stored document being in printer independent format;
    transmitting, to the local client in response to the request to print, a print proxy applet to obtain print processing parameters;
    receiving from the local client print processing parameters; and
    transmitting, to the local client from the networked server, a printer-dependent data stream for printing at a non-networked printer connected to the local client, the printer-dependent data stream being generated at the networked server.

6. The method as claimed in claim 5, wherein the printer-dependent data stream includes executable data for controlling the local non-network printer connected to the local client.

7. The method as claimed in claim 6, wherein the transmitting the request to print a document and transmitting the printer-dependent data stream employ hypertext transfer protocol.

* * * * *